US012624942B2

(12) United States Patent
Cheng et al.

(10) Patent No.: US 12,624,942 B2
(45) Date of Patent: May 12, 2026

(54) APPARATUS AND METHOD FOR QUANTIFYING THE SURFACE FLATNESS OF THREE-DIMENSIONAL POINT CLOUD DATA

(71) Applicant: AIPhotonics Limited, Hong Kong (HK)

(72) Inventors: Hok Chuen Cheng, Hong Kong (HK); Chun Hei Chan, Hong Kong (HK); Wang Kong Lam, Hong Kong (HK); Winston Sun, Hong Kong (HK); Kei Hin Ng, Hong Kong (HK)

(73) Assignee: AIPhotonics Limited, Hong Kong (HK)

( * ) Notice: Subject to any disclaimer, the term of this patent is extended or adjusted under 35 U.S.C. 154(b) by 1078 days.

(21) Appl. No.: 17/765,834

(22) PCT Filed: Oct. 5, 2020

(86) PCT No.: PCT/CN2020/119814
§ 371 (c)(1),
(2) Date: Mar. 31, 2022

(87) PCT Pub. No.: WO2021/063417
PCT Pub. Date: Apr. 8, 2021

(65) Prior Publication Data
US 2022/0412731 A1 Dec. 29, 2022

(30) Foreign Application Priority Data
Oct. 3, 2019 (HK) .................................. 19130482.3

(51) Int. Cl.
*G01B 11/30* (2006.01)
*G01B 11/24* (2006.01)
(Continued)

(52) U.S. Cl.
CPC ............ *G01B 11/303* (2013.01); *G01B 11/24* (2013.01); *G01B 11/306* (2013.01); *G01C 7/00* (2013.01);
(Continued)

(58) Field of Classification Search
CPC ..... G01B 11/303; G01B 11/24; G01B 11/306; G01C 7/00; G01S 7/4817; G01S 17/42;
(Continued)

(56) References Cited

U.S. PATENT DOCUMENTS

| | | | |
|---|---|---|---|
| 2004/0189944 A1 | 9/2004 | Kaufman et al. | |
| 2015/0154467 A1* | 6/2015 | Feng ........................ | G06T 7/12 |
| | | | 382/203 |

(Continued)

FOREIGN PATENT DOCUMENTS

| | | |
|---|---|---|
| CN | 107883873 A | 4/2018 |
| CN | 109341603 A | 2/2019 |

(Continued)

OTHER PUBLICATIONS

Klasing, K., Althoff, D., Dirk, W., & Buss, M. "Comparison of Surface Normal Estimation Methods for Range Sensing Applications" 2009 IEEE Internal Conference on Robotics and Automation. Kobe, Japan (Year: 2009).*

(Continued)

*Primary Examiner* — Isam A Alsomiri
*Assistant Examiner* — Joseph C Fritchman
(74) *Attorney, Agent, or Firm* — Idea Intellectual Limited; Sam T. Yip

(57) ABSTRACT
A method that quantifies the surface flatness of 3D point cloud data in which a test statistic is proposed to indicate the surface flatness based on the threshold of the allowed bump level, the confidence level of test statistics and data density. The method comprises steps of converting the LIDAR (Continued)

measured points to coordinates along the axes using the principal component analysis (PCA) technique; calculating a $Z_\alpha$ value based on the coordinates and predetermined bump tolerance: comparing the $Z_\alpha$ value with a Z score of a test statistic to perform a null hypothesis; and rejecting the null hypothesis when the $Z_\alpha$ value is greater than the Z score.

8 Claims, 8 Drawing Sheets

(51) Int. Cl.

| | |
|---|---|
| *G01C 7/00* | (2006.01) |
| *G01S 7/481* | (2006.01) |
| *G01S 17/42* | (2006.01) |
| *G01S 17/89* | (2020.01) |
| *G06T 7/60* | (2017.01) |

(52) U.S. Cl.
CPC ............ *G01S 7/4817* (2013.01); *G01S 17/42* (2013.01); *G01S 17/89* (2013.01); *G06T 7/60* (2013.01); *G06T 2207/10028* (2013.01)

(58) Field of Classification Search
CPC .. G01S 17/89; G06T 7/60; G06T 2207/10028
See application file for complete search history.

(56) References Cited

U.S. PATENT DOCUMENTS

| | | | |
|---|---|---|---|
| 2018/0321364 A1 | 11/2018 | Sasaki et al. | |
| 2019/0258225 A1 | 8/2019 | Link et al. | |

FOREIGN PATENT DOCUMENTS

| | | | | | |
|---|---|---|---|---|---|
| CN | 109443256 A | | 3/2019 | | |
| CN | 109489548 A | | 3/2019 | | |
| CN | 109685778 A | | 4/2019 | | |
| CN | 109945856 A | | 6/2019 | | |
| CN | 109949303 A | | 6/2019 | | |
| CN | 110021010 A | | 7/2019 | | |
| CN | 110062893 A | | 7/2019 | | |
| JP | 2004138611 A | | 5/2004 | | |
| JP | 6232947 B2 | * | 11/2017 | | |
| KR | 102007326 B1 | * | 8/2019 | .......... | G01B 11/002 |

OTHER PUBLICATIONS

Song, T. Xi, F., Guo, S., Ming, Z., Lin, Y. "A comparison study of algorithms for surface normal determination based on point cloud data". Precision Engineering 39, pp. 47-55 (Year: 2015).*

Cope, 2018, "PCA For 3-dimensional Point Cloud", https://web.archive.org/web/20180209165006/https://www.algosome.com/articles/pca-three-dimensions-point-cloud.html (Year: 2018).*

Yang Kun et al., "Automatic Detection Method of Machining Accuracy Based on 3D Point Cloud", Tool Engineering, Chengdu Tool Research Institute Co., Ltd., Apr. 2019, vol. 53, No. 4, pp. 112-116.

Frank Neuhaus et al., "Terrain Drivability Analysis in 3D Laser Range Data for Autonomous Robot Navigation in Unstructured Environments", 2009 IEEE Conference on Emerging Technologies & Factory Automation, Institute of Electrical and Electronics Engineers, 2009.

First Office Action of corresponding China patent application No. 202080069378.0 mailed on Aug. 30, 2023.

Extended European Search Report of corresponding European patent application No. 20872518.4 mailed on Sep. 14, 2023.

* cited by examiner

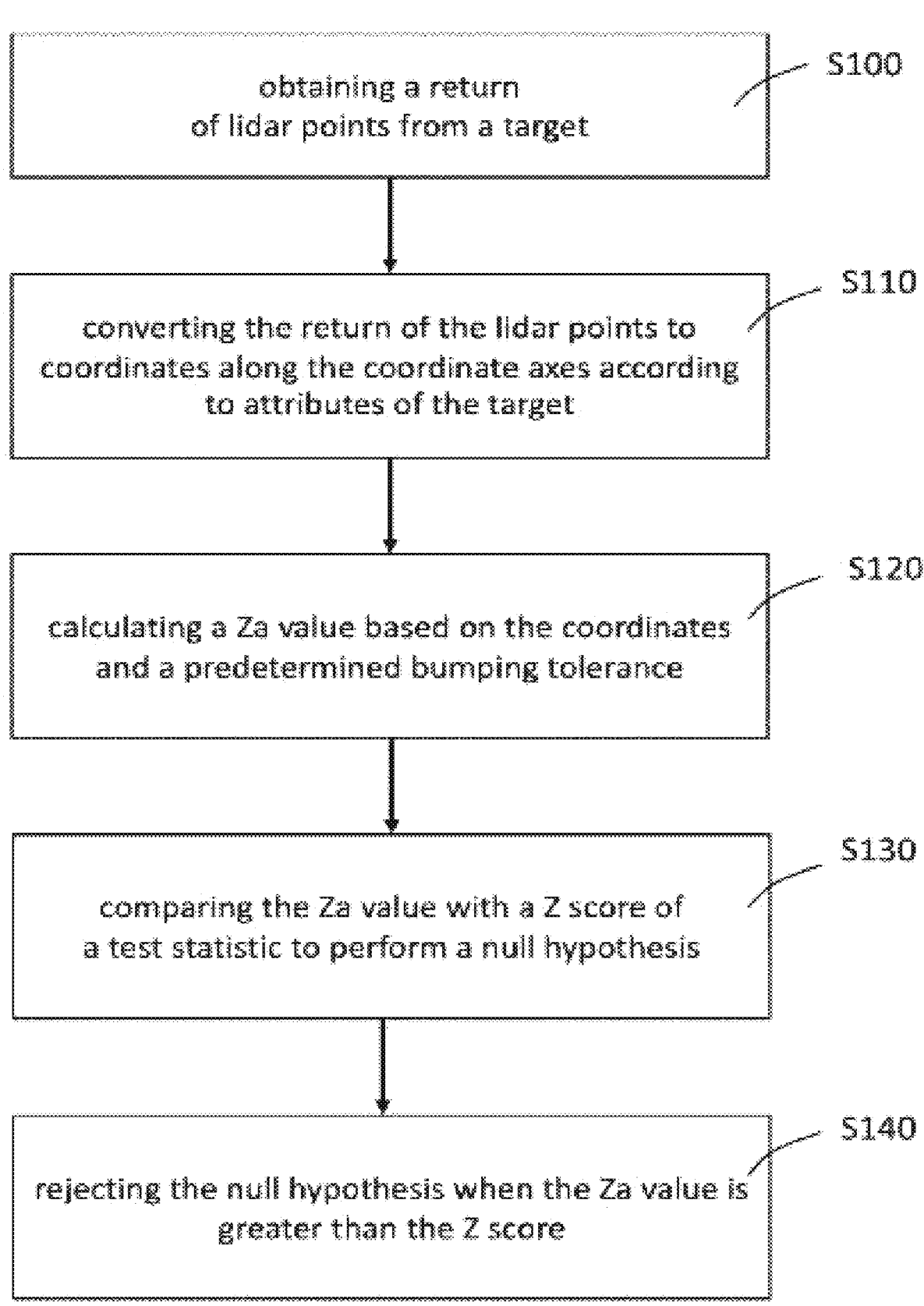

S100 obtaining a return
of lidar points from a target

S110 converting the return of the lidar points to
coordinates along the coordinate axes according
to attributes of the target

S120 calculating a Za value based on the coordinates
and a predetermined bumping tolerance

S130 comparing the Za value with a Z score of
a test statistic to perform a null hypothesis

S140 rejecting the null hypothesis when the Za value is
greater than the Z score

FIG. 2

Difference of local and global means (Range: +/-1.0 cm, PCA: 3D)

700

Local z-value (One-tailed: >1.0cm at 95% CL, PCA: 3D)

710

Difference of local and global means (Range: +/-1.0 cm, PCA: 3D)

Local z-value (One-tailed: >1.0cm at 95% CL, PCA: 3D)

Difference of local and global means (Range: +/-1.0 cm, PCA: 3D)

Local z-value (One-tailed: >1.0cm at 95% CL, PCA: 3D)

APPARATUS AND METHOD FOR QUANTIFYING THE SURFACE FLATNESS OF THREE-DIMENSIONAL POINT CLOUD DATA

FIELD OF THE INVENTION

The present invention relates to three-dimensional (3D) point cloud processing, especially to methods and apparatus for quantifying the surface flatness of a scanned object using 3D point cloud data.

BACKGROUND OF THE INVENTION

Light detection and ranging (LIDAR) is an optical remote sensing technique that densely samples the surfaces of sensing targets. LIDAR usually employs an active optical sensor that transmits laser beams toward the target while moving through specific survey routes. The reflection of the laser from the target is detected and analyzed by receivers in the LIDAR sensor.

LIDAR apparatus typically include a laser source and a scanner that directs the laser source in different directions towards a target to be imaged. Steering of the laser beam may be performed using a rotating material, microelectro-mechanical systems (MEMS), solid state scanning using silicon photonics, or other devices such as a Risley prism. The incident light is reflected from the target being scanned.

The received reflections form a three-dimensional (3D) point cloud of data. The data can be used in many applications, such as building reconstruction and road-marking extraction. Normal estimation is a fundamental task in 3D point cloud processing. Known normal estimation methods can be classified into regression-based methods, Vorono-based methods and deep-learning methods.

The regression-based method assumes the surface of an object is smooth all around, and thus the local neighborhood of any point on the surface can be well-approximated by a plane. In general, the principal component analysis (PCA) involves a covariance matrix computation of the neighbor-hood points, and then organizing the information in principle components. This method is widely used because it is easy to implement and quick to perform. However, the distorted point cloud data collected by the LiDAR scanner are smeared out with a standard deviation of 6-8 mm in the range measurement. Further, as PCA is an orthogonal linear transformation, it cannot smooth out sharp features in the data.

Accordingly, for different applications and purposes, many techniques were presented to improve the robustness of the method. However, the techniques often involve a nontrivial trial-and-error process in order to obtain satisfactory results. The manual selection of parameters involved is also time consuming.

SUMMARY OF THE INVENTION

An objective of the present invention is to provide an unbiased estimator that quantifies the bumps of a surface, such as a wall, ceiling and floor of a three-dimensional (3D) point cloud.

In accordance to one aspect of the present invention, a proposed estimation of the surface flatness is provided based on the threshold of the bump level, the confidence level of test statistics and data density.

According to one embodiment of the present invention, the method comprises a conversion of the LIDAR measured points to coordinates using the principal component analysis (PCA) technique; a calculation of a $Z_\alpha$ value based on the coordinates and predetermined bump tolerance; comparing the $Z_\alpha$ value with a Z score of a test statistic to perform a null hypothesis; and rejecting the null hypothesis when the $Z_\alpha$ value is greater than a Z score. The calculation of the $Z_\alpha$ value can be defined by the following relationship:

$$\frac{|\bar{r}_{local} - \bar{r}_{global}| - d}{\sigma_{r,global} / \sqrt{N_{local}}};$$

wherein $\bar{r}_{local}$ is a local mean of coordinates, $\bar{r}_{global}$ is a global mean of coordinates, $\sigma_{r,global}$ is a global standard deviation of coordinates, $N_{local}$ is the number of local sample events, and d is the predetermined bump tolerance.

Accordingly, the present invention is able to quantify the surface flatness easily by using the converted coordinates and the given bump tolerance. The results of the test statistics can be an indicator for local bumps of 3D cloud point data.

BRIEF DESCRIPTION OF THE DRAWINGS

The invention is presented in more details using imple-mentation examples of the drawings below. In the attached drawings:

FIG. 2 is a flow chart illustrating a method that quantifies the surface flatness of 3D point cloud data in accordance with an embodiment of the present invention;

DETAILED DESCRIPTION

In the following description, the apparatuses and methods for quantifying the surface flatness of three-dimensional (3D) point cloud data and the likes are set forth as preferred examples. It will be apparent to those skilled in the art that modifications, including additions and/or substitutions may be made without departing from the scope and spirit of the invention. Specific details may be omitted, so as not to obscure the invention; however, the disclosure is written to enable one skilled in the art to practice the teachings herein without undue experimentation.

Figure 1:
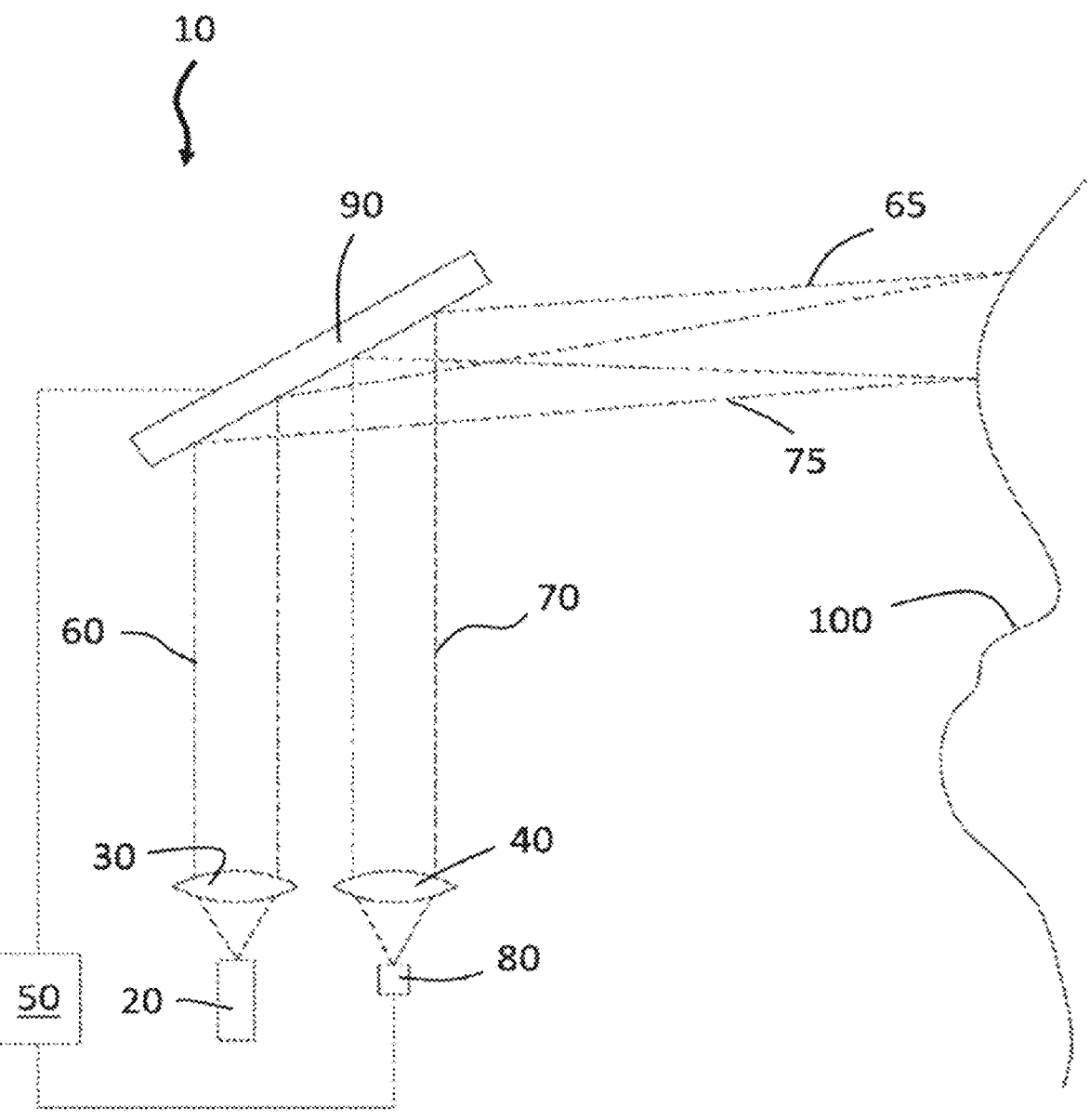
FIG. 1 depicts a LIDAR system for quantifying surface flatness according to one aspect.

Turning to FIG. 1, a LIDAR system 10 that can quantify surface flatness is depicted. The LIDAR system 10 includes a laser source 20 which emits light 60, the light 60 typically passing though optics 30 such as a collimating lens. The laser 20 may be, for example, a 600-1000 nm laser, or a 1550 nm band laser. A single laser source or multiple laser sources may be used. Alternatively, a flash LIDAR camera may be employed.

The light 60 is incident on a scanning device 90. The scanning device may be a rotating mirror (polygonal or planar), a MEMS device, a prism, or another other type of device that can scan a laser beam on the surface of a target object 100 to be scanned. Image development speed is controlled by the speed at which the target object is to be scanned. The scanner beam 65 is reflected as reflected beam 75 which is directed off the scanning device 90 into beam 70 through optics 40 and into photodetector 80. Photodetector 80 may be selected from solid-state photodetectors such as silicon avalanche photodiodes or photomultipliers, CCDs, CMOS devices etc. A controller 50 electrically communicates with laser source 20, photodiode 80, and scanning device 90. The controller may be one or more processing devices such as one or more microprocessors, and the techniques of the present invention may be implemented in hardware software, or application-specific integrated circuitry.

The LIDAR system 10 generates a point cloud of data. A point cloud is a collection of data points that represents a three-dimensional shape or feature. Each point in the point cloud is associated with a color, which indicates the intensity of the received signal. For measuring applications, a 3-D model from the point cloud is generated from which measurements may be taken.

Figure 3:
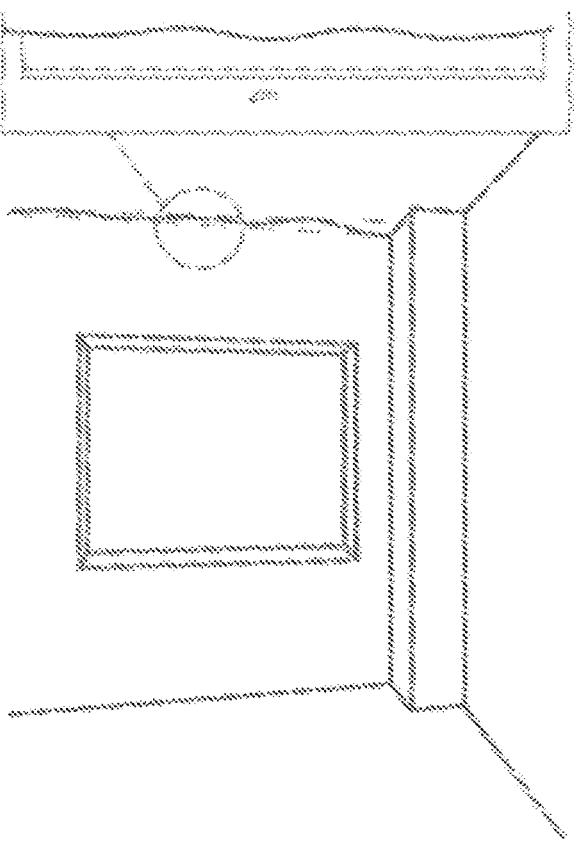
FIG. 3 is an exemplary diagram illustrating a flatness of a ceiling line where the wall meets the ceiling.

With reference to FIGS. 2 and 3, FIG. 2 is a flow chart illustrating a method that quantifies the surface flatness of 3D point cloud data in accordance with an embodiment of the present invention; and FIG. 3 is an exemplary diagram illustrating the flatness of a ceiling line where the wall meets the ceiling.

As shown in FIG. 2, in this embodiment, the method using aforementioned LIDAR system to quantify the surface flatness of a scanned object using 3D point cloud data, which comprises steps of S100: obtaining LIDAR measured points from target 100, S110: converting the LIDAR measured points to coordinates along the coordinate axes according to the attributes of the target 100, S120 calculating a $Z_\alpha$ value based on the coordinates and predetermined bump tolerance, S130 comparing the $Z_\alpha$ value with a Z score of a test statistic to perform a null hypothesis, and S140 rejecting the null hypothesis when the $Z_\alpha$ value is greater than the Z score.

In the step of S110, a principal component analysis (PCA) is performed to transform the attributes of the target 100 into coordinate axes. PCA is a dimensionality-reduction method that is used to reduce the dimensionality of large data sets.

The target can include, a local bump/projection on the surface of a target. For example, the target may be a relatively flat surface such as a wall, a ceiling or a floor or a join of two surface such as a ceiling line shown in FIG. 3.

Figure 4:
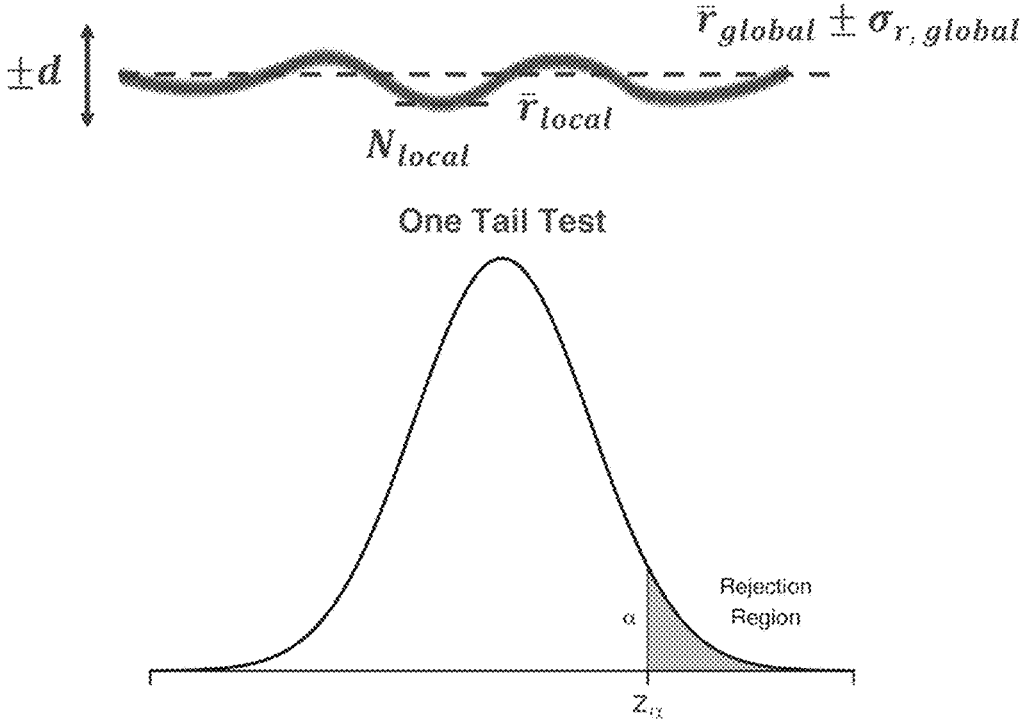
FIG. 4 is an exemplary diagram illustrating a Null hypoth-esis of a one tail (right) test with a bell-shaped curve.

With further reference to FIG. 4, FIG. 4 is an exemplary diagram illustrating a Null hypothesis of a one tail (right) test with a bell-shaped curve. In the steps of S120 to S140, the present invention proposes a Null hypothesis of a one tail (right) test that claims the surface flatness of the target is smaller than a predetermined bump tolerance (i.e., considered as flat). The value of the Z score corresponds to the standard normal distribution table. For example, the Z score is 1.645 when the confidence level is 95%. In another embodiment, the Z score is 2.363 when the test statistic has a 99% confidence level.

In step S120, the $Z_\alpha$ value of the test statistic has a relationship of:

$$Z_\alpha = \frac{|\bar{r}_{local} - \bar{r}_{global}| - d}{\sigma_{r,global} / \sqrt{N_{local}}};$$

wherein $\bar{r}_{local}$ is a local mean of coordinates, $\bar{r}_{global}$ is a global mean of coordinates, $\sigma_{r,global}$ is a global standard deviation of coordinates, $N_{local}$ is the number of local sample events, and d is the predetermined bump tolerance. $|\bar{r}_{local} - \bar{r}_{global}| \leq d$.

Accordingly, in the null hypothesis test, the null hypothesis states $|\bar{r}_{local} - \bar{r}_{global}|$, is small or equal to the predetermined bump tolerance. The steps of S120 to S140 then calculate and compare to ensure the statement is true or not as the LIDAR measured points have been converted to coordinates by the PCA technique. When the $Z_\alpha$ value is greater than the Z score, the $Z_\alpha$ value falls in the reject region, meaning that the null hypothesis statement is not true.

According to inventor's experimentation, using a Z-test of test statistics with converted coordinates, the results can be an indicator of local bumps.

In an embodiment, the predetermined bump tolerance is 1 centimeter, preferably within a range of 0.5 to 1.5 centimeters.

In actual practice, standardizing the target with a known bump size is used to determine the best value for bump tolerance and to minimize false negatives at the same confidence level. A grid size (where the grid is a region under analysis, for example, a 30 cm×30 cm area of a wall) may be optimized for minimal false positive rate (i.e., failing to detect bumps in a quality test.)

In one embodiment, calibrations for targets with different incident angles, ranges, texture and refractivity are performed to correct detection distortion before the surface flatness estimation.

EXAMPLE

Wall with a Bump/Projection

Figure 5:
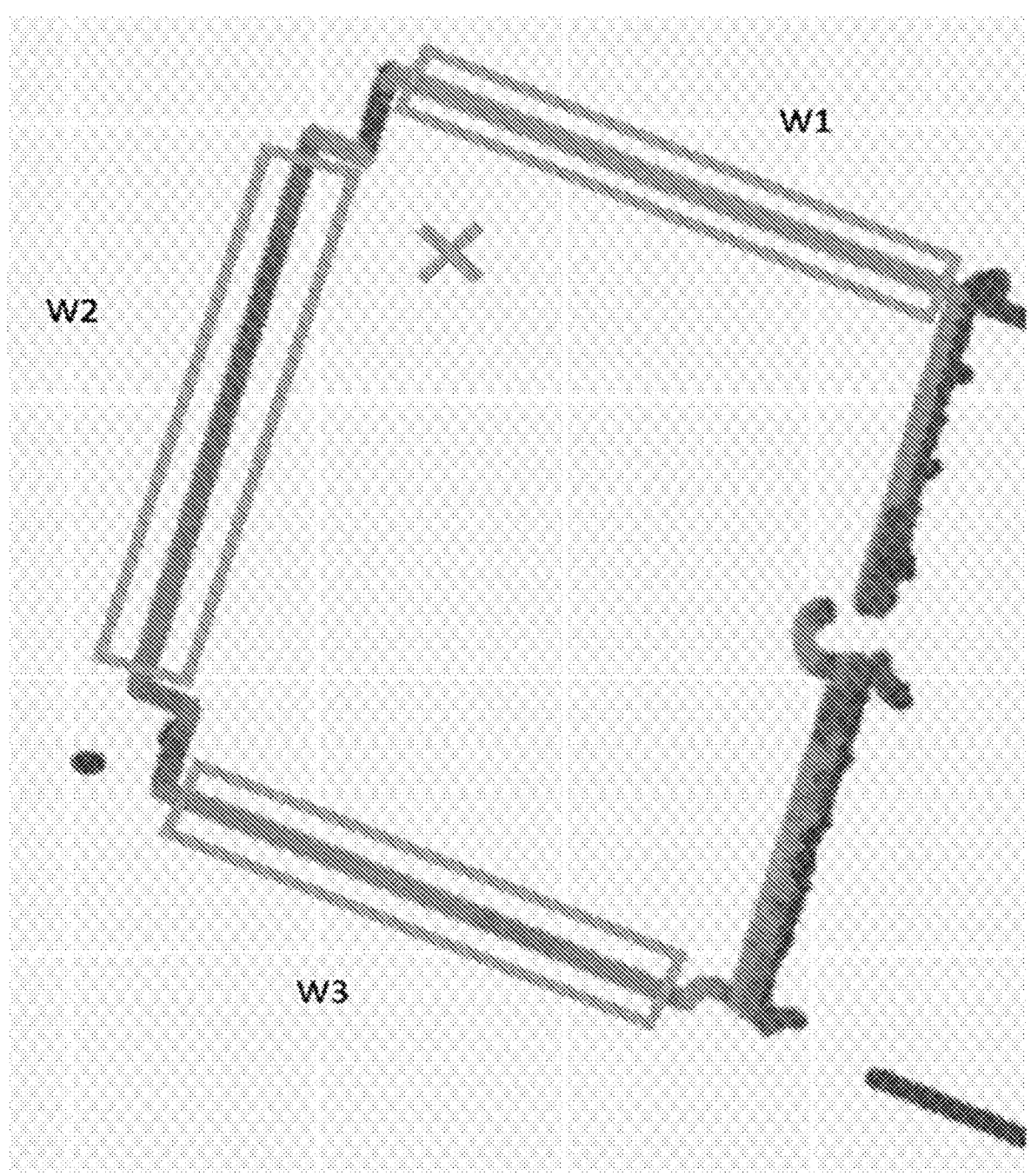
FIG. 5 is an exemplary diagram illustrating a LIDAR system being disposed to collect data points that represents a three-dimensional shape in a room.
Figure 6A:
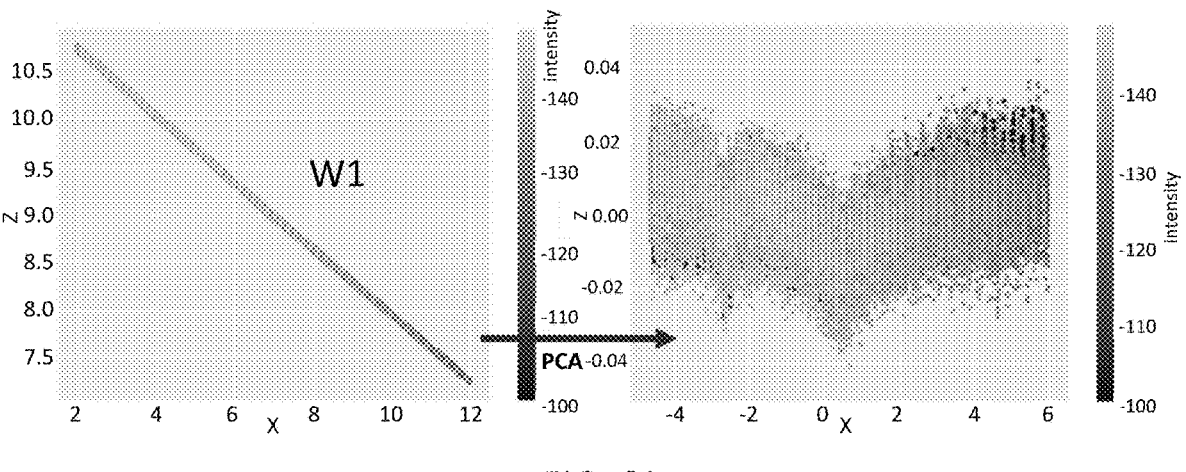
FIGS. 6A-6C are exemplary diagrams illustrating the conversion of the LIDAR points return to coordinates along the coordinate axes.
Figure 6B:
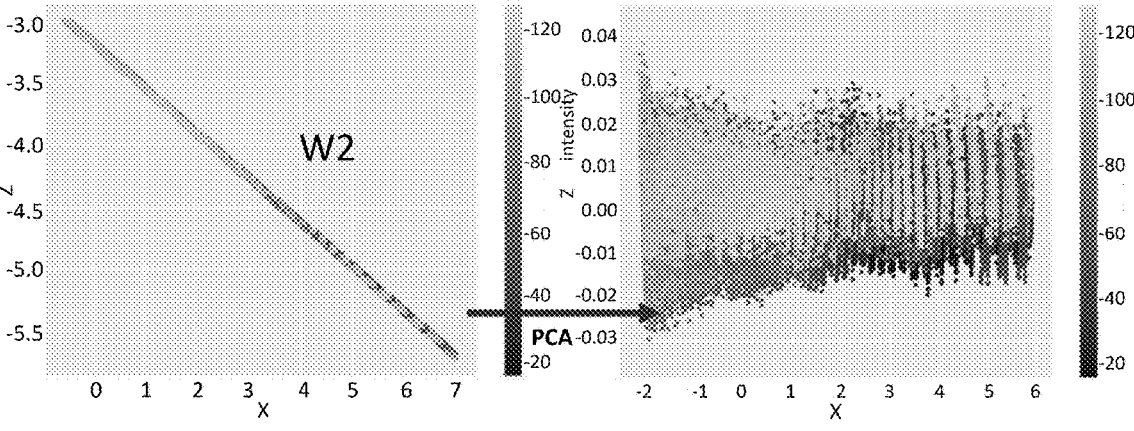
Figure 6C:
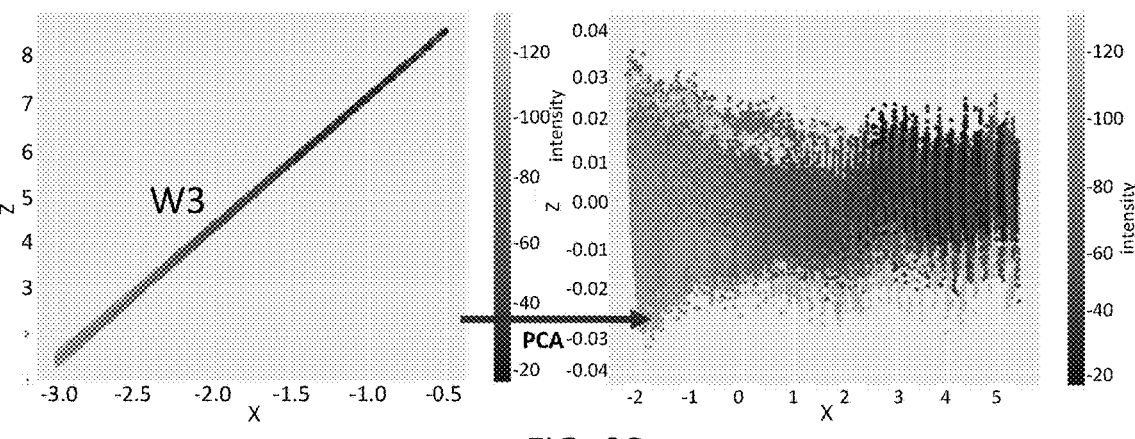

With reference to FIGS. 5 and 6A-6C, FIG. 5 is an exemplary diagram illustrating a LIDAR system being disposed to collect data points that represent a three-dimensional shape in a room; and FIGS. 6A-6C are exemplary diagrams illustrating the conversion of the LIDAR points' return to coordinates along the coordinate axes.

In this embodiment, as shown in FIG. 5, a LIDAR system is placed in an empty room and is configured to perform a 3D scanning that builds the 3D cloud point data of the room. However, it is noted that the ceiling and the floor are omitted for clarity, and the targets (i.e., the wall W1, W2, W3) are manually segmented. Each of the segmented walls are used as a target to test the performance of the Null hypothesis testing.

As above-mentioned, in step S110 of the present invention, a principal component analysis (PCA) is performed to transform the attributes of the target into coordinate axes. Since the assumption of the length and the width of the corresponding surface are much larger than the predetermined bump tolerance d, the length and width of the surface of the wall are aligned to PC1(x), PC2(y) axes respectively after PCA. PCA thus reduces the dimensionality of data such that a "one-dimensional" hypothesis test can be carried out in the direction of PC3(z) or "the thickness of the surface".

As shown in FIGS. 6A-6C, PCA is performed to the segmented walls respectively that aligns the x-axis with the long side of the wall and z-axis with the thickness of the wall.

Figure 7A:
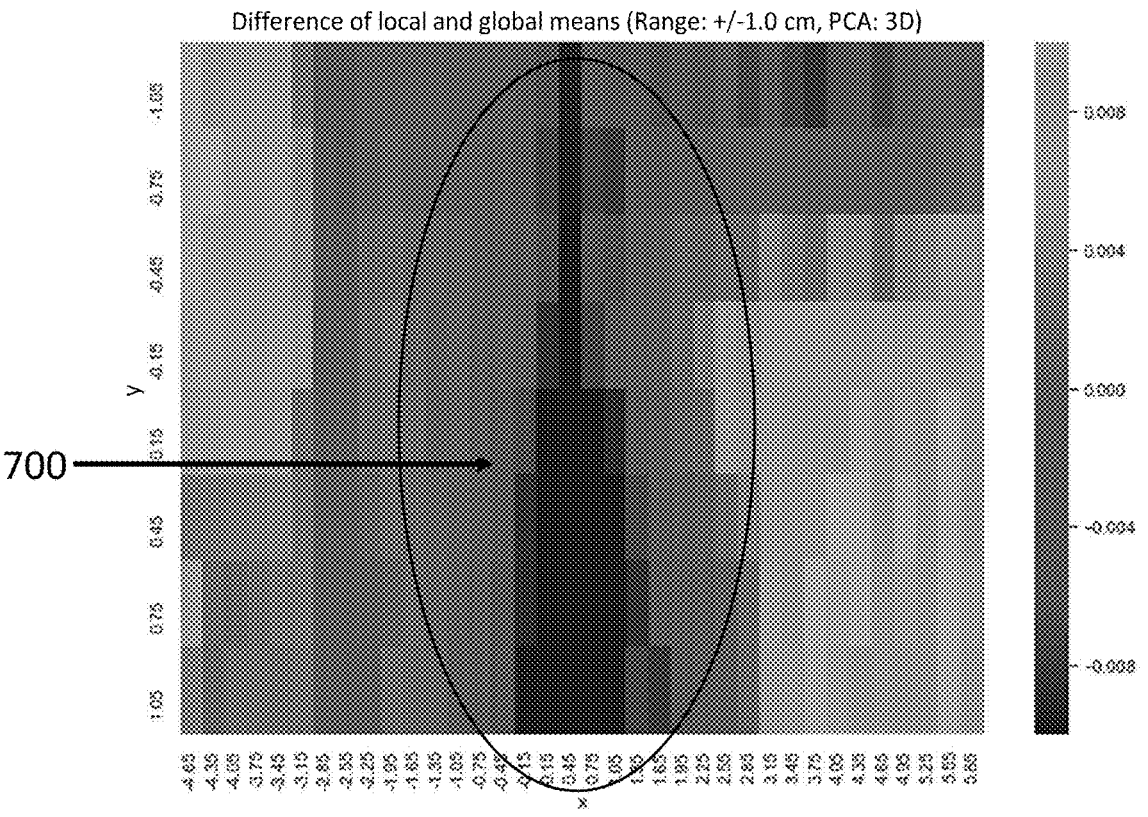
FIGS. 7A and 7B are two-dimensional (2D) plot diagrams illustrating the distributions of the values by performing the method to the coordinates of FIG. 6A in accordance with an embodiment of the invention.
Figure 7B:
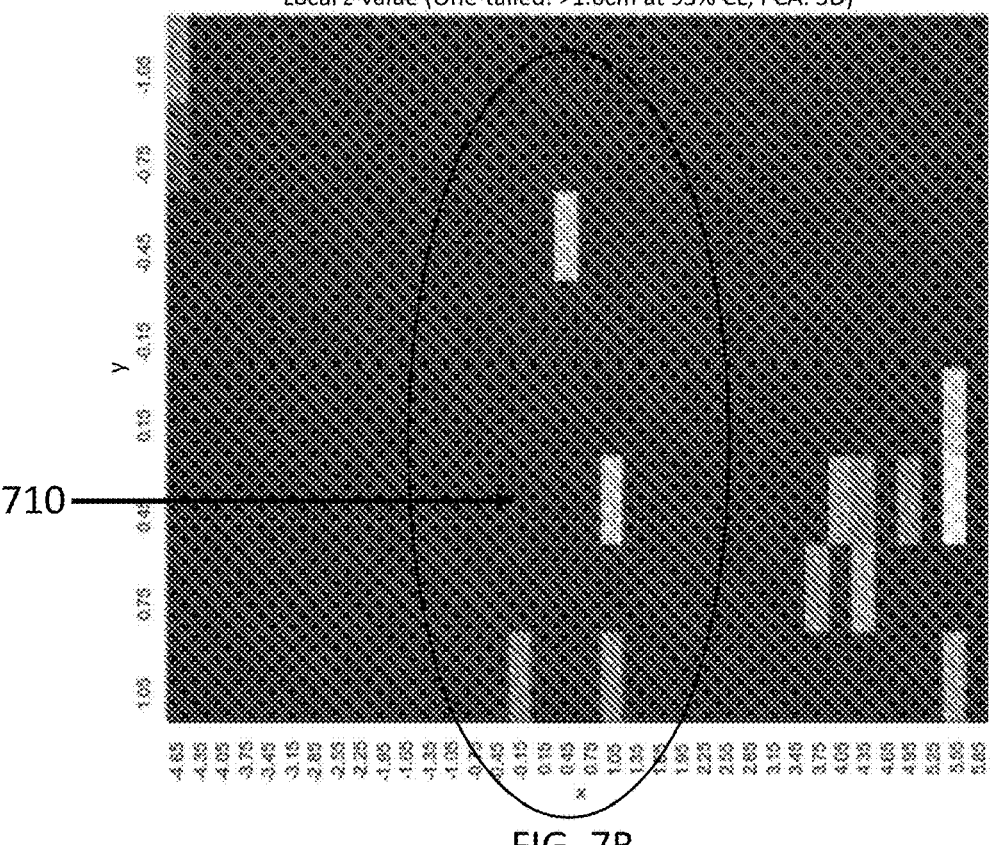
Figure 8A:
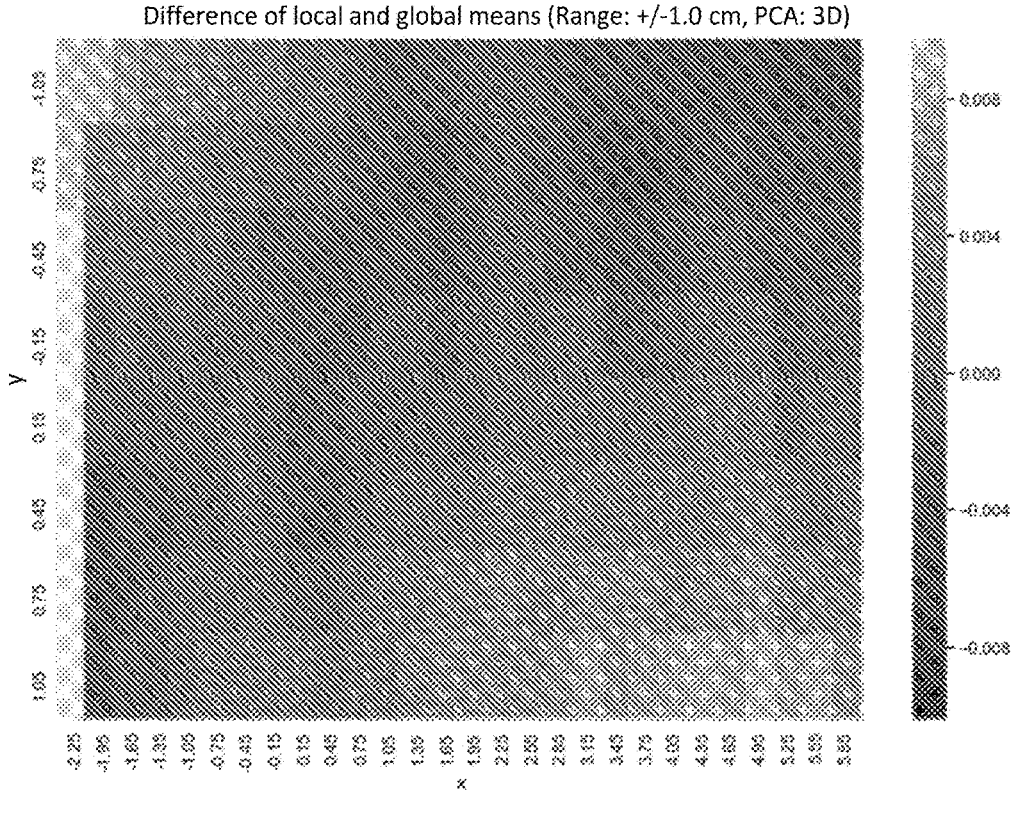
FIGS. 8A and 8B are 2D plot diagrams illustrating the distributions of the values by performing the method to the coordinates of FIG. 6B in accordance with an embodiment of the invention.
Figure 8B:
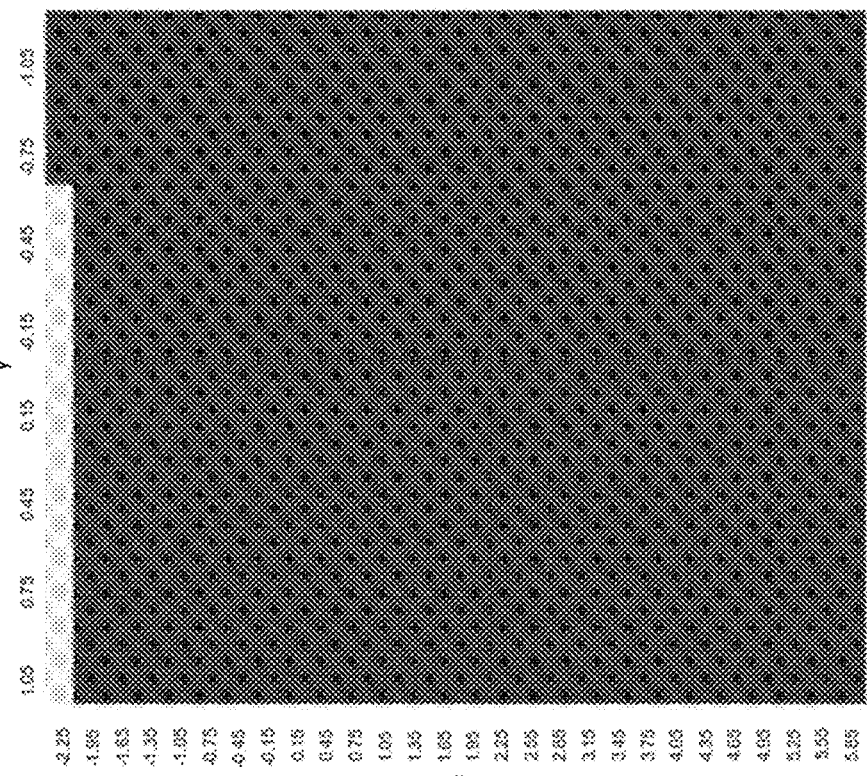
Figure 9A:
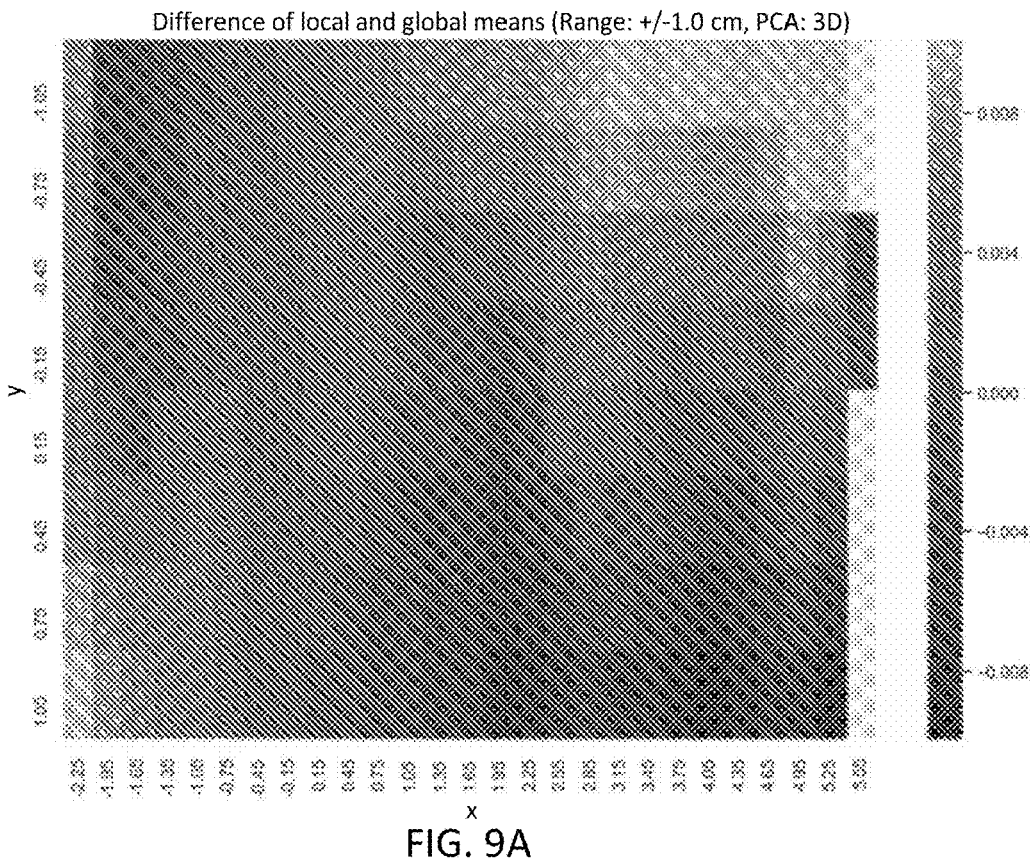
FIGS. 9A and 9B are 2D plot diagrams illustrating the distributions of the values by performing the method to the coordinates of FIG. 6C in accordance with an embodiment of the invention.
Figure 9B:
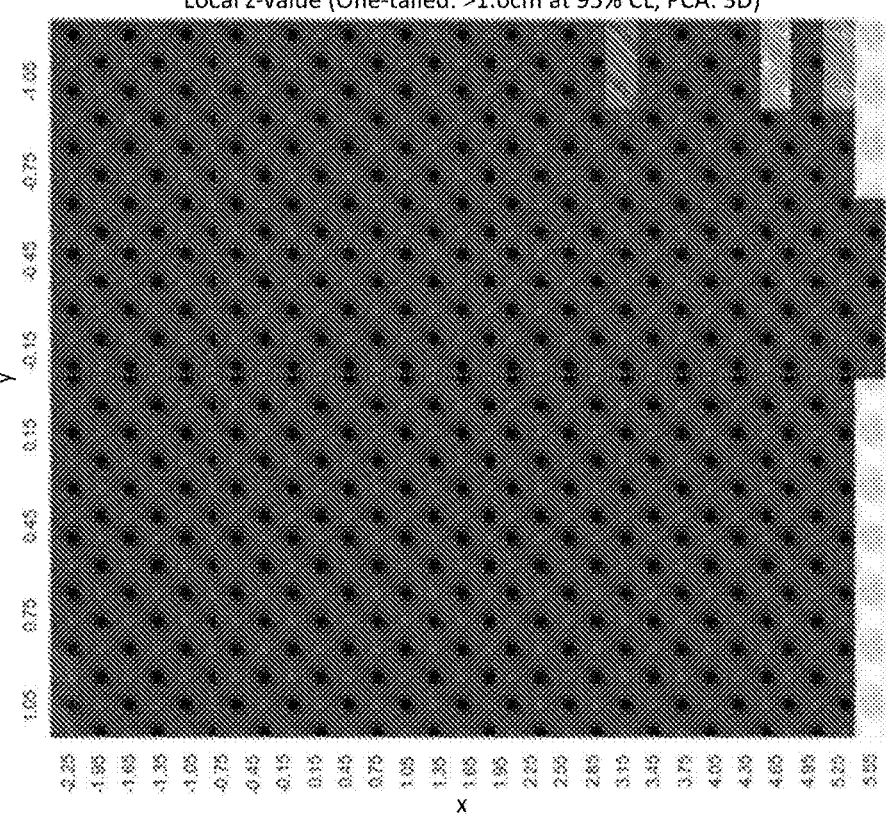

With further reference to FIGS. 7A-7B, 8A-8B and 9A-9B, FIGS. 7A and 7B are two-dimensional (2D) plot diagrams illustrating the distributions of the values by performing the method to the coordinates of FIG. 6A in accordance with an embodiment of the invention; FIGS. 8A and 8B are 2D plot diagrams illustrating the distributions of the values by performing the method to the coordinates of FIG. 6B in accordance with an embodiment of the invention; and FIGS. 9A and 9B are 2D plot diagrams illustrating the distributions of the values by performing the method to the coordinates of FIG. 6C in accordance with an embodiment of the invention.

As shown in FIGS. 7A and 7B, the differences of the local mean of coordinates ($\bar{r}_{local}$) and global mean of coordinates ($\bar{r}_{global}$) of the first wall W1 are plotted in FIG. 7A. In FIG. 7A, the darkest region 700, near the middle bottom in the plot, indicates that the mean of the local coordinates and the global coordinates differ more than 1 cm and hence indicates a bump in the wall according to the predetermined bump tolerance of 1 cm. The $Z_a$ values of the first wall W1 are plotted in FIG. 7B. As shown in FIG. 7B, the region 710, near the middle bottom in the plot, indicates that the Za value is greater than the Z score (Z score is 1.645 at a confidence level of 95%, and color/gray scale is set to a range from 0 to 1.645) for a rejection of the null hypothesis. In other words, the mean of the local coordinates does deviate from the mean of the global coordinates of a value larger than the predetermined bump tolerance. This indicates that the region 710 failed the hypothesis test and a bump is "detected" on the first wall W1 near the middle bottom.

In similar manner, the differences of the local mean of coordinates ($\bar{r}_{local}$) and the global mean of coordinates ($\bar{r}_{global}$) of the second and third wall W2, W3 are plotted in FIGS. 8A and 9A, respectively. The Za values of the second and third wall W2, W3 are plotted in FIGS. 8B and 9B respectively. For walls W2 and W3, the measured point cloud is consistent with a flat surface within a predetermined bump tolerance of 1 cm. In other words, none of Za values plotted in FIGS. 8B and 9B is greater than Z score (1.645 at a confidence level of 95%).

The embodiments disclosed herein may be implemented using general purpose or specialized computing devices, mobile communication devices, computer processors, or electronic circuitries, including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, mobile communication devices, computer processors or programmable logic devices can readily be prepared by practitioners skilled in the software or electronic art based on the teachings of the present disclosure.

In some embodiments, the present invention includes computer storage media having computer instructions or software codes stored therein, which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media devices suitable for storing instructions, codes and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention and its various embodiments and modifications. It is intended that the scope of the invention be defined by the following claims and their equivalence.

The invention claimed is:

1. A Light Detection and Ranging (LiDAR) system for determining surface flatness, comprising:
   a laser configured for generating laser light beam;
   a scanner configured for scanning the laser light beam along a three-dimensional (3D) target surface;
   a photodetector configured for obtaining measured points from detected reflected light from the target surface, wherein the measured points form a point cloud;
   a processor configured for:
      converting the point cloud to target surface sample coordinates along coordinate axes according to length, width, and thickness of the target surface using principal component analysis (PCA);
      computing a local mean of thickness of the target surface sample coordinates;
      computing a global mean of thickness of the target surface sample coordinates;
      computing a global standard deviation of thickness of the target surface sample coordinates;
      computing a $Z_\alpha$ value from the local mean of thickness of the target surface sample coordinates, the global mean of thickness of the target surface sample coordinates, the global standard deviation of thickness of the target surface sample coordinates, number of local samples of the target surface sample coordinates, and a predetermined bump tolerance;
      comparing the $Z_\alpha$ value with a Z score of a test statistic, wherein the Z score is a value that corresponds to a confidence level; and
      determining that a bump larger than the bump tolerance exists on the target surface and that surface flatness of the target surface is outside of the bump tolerance if the $Z_\alpha$ value is greater than the Z score;
      producing three-dimensional measurements of the target surface based on the $Z_\alpha$ value, thereby quantifying surface flatness of the target surface.

2. The LiDAR system of claim 1, wherein the predetermined bump tolerance is in a range of 0.5 to 1.5 centimeters.

3. The LiDAR system of claim 1, wherein the test statistic is determined by a null hypothesis of a one tail test that states that the surface flatness of the target surface is within the predetermined bump tolerance.

4. The LiDAR system of claim 1, wherein a predetermined target surface with a known bump size is used to determine the predetermined bump tolerance.

5. The LiDAR system of claim 1 wherein the scanner is selected from a mirror, a polygonal mirror, or a MEMS device.

6. The LiDAR system of in claim 1, further comprising performing one or more calibrations for one or more target surfaces with different incident angles, ranges, texture and refractivity to correct detection distortion.

7. The LiDAR system of claim 1 wherein the photodetector is selected from a silicon avalanche photodiode, a photomultiplier, a charge-couple device (CCD), or a complementary metal-oxide-semiconductor (CMOS) device.

8. The LiDAR system of claim 1, wherein the $Z_\alpha$ value has the following relation:

$$Z_\alpha = \frac{|\bar{r}_{local} - \bar{r}_{global}| - d}{\sigma_{r,global} / \sqrt{N_{local}}};$$

and wherein $\bar{r}_{local}$ is the local mean of thickness of the target surface sample coordinates, $\bar{r}_{global}$ is the global mean of thickness of the target surface sample coordinates, $\sigma_{r,global}$ is the global standard deviation of thickness of the target surface sample coordinates, $N_{local}$ is a number of local samples of the target surface sample coordinates, and d is the predetermined bump tolerance.

\* \* \* \* \*